US010658920B2

(12) United States Patent
He et al.

(10) Patent No.: US 10,658,920 B2
(45) Date of Patent: May 19, 2020

(54) FAULT-TOLERANT TOPOLOGY FOR MULTILEVEL T-TYPE CONVERTERS

(71) Applicant: Marquette University, Milwaukee, WI (US)

(72) Inventors: Jiangbiao He, Schenectady, NY (US); Nabeel A. O. Demerdash, New Berlin, WI (US)

(73) Assignee: Marquette University, Milwaukee, WI (US)

( * ) Notice: Subject to any disclaimer, the term of this patent is extended or adjusted under 35 U.S.C. 154(b) by 0 days.

(21) Appl. No.: 15/775,246

(22) PCT Filed: Nov. 10, 2016

(86) PCT No.: PCT/US2016/061338
§ 371 (c)(1),
(2) Date: May 10, 2018

(87) PCT Pub. No.: WO2017/083521
PCT Pub. Date: May 18, 2017

(65) Prior Publication Data
US 2018/0337590 A1 Nov. 22, 2018

Related U.S. Application Data

(60) Provisional application No. 62/255,075, filed on Nov. 13, 2015.

(51) Int. Cl.
*H02P 27/08* (2006.01)
*H02M 1/32* (2007.01)
(Continued)

(52) U.S. Cl.
CPC ............. *H02M 1/32* (2013.01); *H02M 1/083* (2013.01); *H02M 7/487* (2013.01);
(Continued)

(58) Field of Classification Search
CPC .......... H02M 5/597; H02M 1/08; H02M 5/27; H02M 7/487; H02M 7/483; H02M 3/1584
See application file for complete search history.

(56) References Cited

U.S. PATENT DOCUMENTS 6,459,606 B1 * 10/2002 Jadric ................... H02M 5/297
363/163
6,972,972 B2 * 12/2005 Duncan ................. H02M 7/003
363/131

(Continued)

FOREIGN PATENT DOCUMENTS

AU 665152 B2 12/1995
CN 104578865 A 4/2015
(Continued)

OTHER PUBLICATIONS

International Search Report and Written Opinion in corresponding International Application No. PCT/US2016/061338, dated Mar. 16, 2017.

*Primary Examiner* — Rina I Duda
(74) *Attorney, Agent, or Firm* — Andrus Intellectual Property Law, LLP

(57) ABSTRACT

Systems and methods of fault tolerant power conversion include an inverter with a plurality of inverter phase legs. Each phase leg includes a positive switch, a negative switch, and a bi-directional midpoint switch. Redundant phase leg includes a positive redundant switch connected between the positive switches and the bi-directional midpoint switches. The redundant phase leg includes a negative redundant switch connected between the negative switches and the bi-directional midpoint switches. Upon detection of a fault condition in at least one switch of the plurality of inverted phase legs, one of the positive redundant switch and the negative redundant switch is closed to bypass at least one (Continued)

switch with the fault condition to maintain operation of the power converter.

21 Claims, 5 Drawing Sheets

(51) Int. Cl.
| | |
|---|---|
| *H02M 7/487* | (2007.01) |
| *H02P 29/032* | (2016.01) |
| *H02M 1/08* | (2006.01) |
| *H02M 7/5395* | (2006.01) |
| *H02P 29/028* | (2016.01) |
| *H02M 1/00* | (2006.01) |

(52) U.S. Cl.
CPC .......... *H02M 7/5395* (2013.01); *H02P 27/08* (2013.01); *H02P 29/028* (2013.01); *H02P 29/032* (2016.02); *H02M 2001/0058* (2013.01); *H02M 2001/325* (2013.01); *H02M 2001/327* (2013.01)

(56) References Cited

U.S. PATENT DOCUMENTS

| | | | | |
|---|---|---|---|---|
| 8,737,103 | B2* | 5/2014 | Kieferndorf | H02M 7/487 363/131 |
| 8,847,328 | B1* | 9/2014 | Laschek-Enders | H01L 27/0647 257/401 |
| 2012/0013369 | A1* | 1/2012 | Coteus | H02M 3/33592 327/109 |
| 2013/0148391 | A1 | 6/2013 | Grbovic et al. | |
| 2014/0369088 | A1* | 12/2014 | Yoo | H02M 5/458 363/37 |
| 2014/0376287 | A1* | 12/2014 | Narimani | H02M 3/07 363/60 |
| 2015/0023080 | A1* | 1/2015 | Chambon | H02M 1/0845 363/131 |

FOREIGN PATENT DOCUMENTS

| | | |
|---|---|---|
| JP | S61214775 A | 9/1986 |
| WO | 2015090735 A1 | 6/2015 |

* cited by examiner

FAULT-TOLERANT TOPOLOGY FOR MULTILEVEL T-TYPE CONVERTERS

STATEMENT REGARDING FEDERALLY SPONSORED RESEARCH OR DEVELOPMENT

This invention was made with government support under NSF-GOALI Grant No. 1028348 awarded by U.S. National Science Foundation (NSF). The government has certain rights in the invention.

CROSS REFERENCE TO RELATED APPLICATION

This application is the U.S. national stage application of International Application PCT/US2016/061338, filed Nov. 10, 2016, which international application was published on May 18, 2017, as International Publication WO2017/083521 in the English language. The international application is incorporated herein by reference, in entirety. The international application claims priority to U.S. Provisional Patent Application Ser. No. 62/255,075 filed Nov. 13, 2015, which is herein incorporated in entirety.

BACKGROUND

The field of the invention relates to topology of power converters. In particular, the field of the invention relates to fault-tolerant topology for multilevel T-type power converters.

A power converter is the most fundamental functional unit in all solid-state power conversion systems, and therefore its fault-tolerant capability plays a critical role in the systems' reliability. Among multilevel power converters, the T-Type neutral-point-clamped (NPC) converter has been regarded as a very promising breed of high-performance multilevel inverters in industrial applications, because of the relatively lower number of switching devices used and higher efficiency compared with the conventional I-Type NPC inverters.

Like other types of multilevel converters, T-Type NPC inverters are not immune to switching device faults, for example, insulated-gate bipolar transistor (IGBT) open-circuit or short-circuit faults. Such switching device faults could cause catastrophic system failures if no fault-tolerant solution is provided when such inverters are applied in safety-critical applications, such as electric vehicles (EV), hybrid-electric vehicles (HEV), Uninterruptable Power Supplies (UPSs), solar inverters, and the like. Although the T-Type NPC inverter has certain inherent fault-tolerant capability due to its unique topology, the output voltage and linear operating range will be derated significantly during fault-tolerant operation, which is not allowed in some applications (e.g., UPS, EV, etc.) where rated voltage is a stringent requirement. Therefore, it would be of great significance to improve the inverter topology with satisfactory fault-tolerant characteristics, to guarantee rated output voltages under faulty conditions.

The existing solution for the fault-tolerant operation of T-Type NPC inverters is mainly achieved by paralleling one or three redundant inverter legs. This does ensure a rated voltage output under inverter faulty condition, but at a much higher system cost with decreased efficiency due to much more additional semiconductor devices employed. Rather, most of the redundant semiconductor devices in the existing fault-tolerant topology idle in the circuit without contribution to system performance improvement under healthy conditions. This degrades system efficiency due to additional switching and conduction losses.

Another previous attempt to improve fault-tolerance of T-Type NPC converters uses a software control strategy by using the limited inherent fault-tolerant capabilities of the T-Type converters. The drawback of this fault-tolerant solution is the derated output voltage during post-fault operation.

BRIEF DISCLOSURE

An exemplary embodiment of a power conversion system includes an inverter with a plurality of inverter phase legs. Each phase leg of the inverter includes a positive switch, and negative switch, and a bi-directional midpoint switch. A redundant phase leg includes a positive redundant switch and a negative redundant switch. The positive redundant switch is connected in series with the bi-directional midpoint switches and in parallel with the positive switches through the bi-directional midpoint switches. The negative redundant switch is connected in series with the bi-directional midpoint switches and in parallel with the negative switches through the bi-directional midpoint switches. Upon detection of a fault condition in at least one switch of the plurality of inverted phase legs, one of the positive redundant switches and the negative redundant switches are closed to bypass the at least one switch with the fault condition and maintain operation of the power conversion system.

An exemplary embodiment of a method of fault tolerant operation of a T-Type power converter includes providing a T-Type power converter. The T-Type power converter includes a DC-bus which further includes a DC-bus midpoint and three inverter phase legs operatively connected to the DC-bus. Each phase leg includes a positive switch, a negative switch, and a bi-directional midpoint switch. A redundant phase leg includes a positive redundant switch and a negative redundant switch. The positive and negative redundant switches are connected in series with the bi-directional midpoint switches through a redundant mid point. The positive redundant switch is connected in parallel with the positive switches through the bi-directional midpoint switches. The negative redundant switch is connected in parallel with the negative switches through the bi-directional midpoint switches. A midpoint redundant switch is connected between the DC-bus midpoint and the redundant midpoint. At least one current within the T-Type power converter is monitored with a microcontroller. A fault condition in the T-Type power converter is identified based upon the at least one current. A switch location of the fault condition is determined based upon the at least one current. Upon detection of the fault condition, the bi-directional midpoint redundant switch is switched to an open condition. At least one of the positive redundant switches and the negative redundant switches is switched to a closed condition to bypass the faulty switch. Operation of the T-Type power converter is maintained.

DETAILED DISCLOSURE

The disclosed subject matter further may be described utilizing terms as defined below.

Unless otherwise specified or indicated by context, the terms "a", "an", and "the" mean "one or more."

As used herein, "about", "approximately," "substantially," and "significantly" will be understood by persons of ordinary skill in the art and will vary to some extent on the context in which they are used. If there are uses of the term which are not clear to persons of ordinary skill in the art given the context in which it is used, "about" and "approximately" will mean plus or minus ≤10% of the particular term and "substantially" and "significantly" will mean plus or minus >10% of the particular term.

As used herein, the terms "include" and "including" have the same meaning as the terms "comprise" and "comprising." The terms "comprise" and "comprising" should be interpreted as being "open" transitional terms that permit the inclusion of additional components further to those components recited in the claims. The terms "consist" and "consisting of" should be interpreted as being "closed" transitional terms that do not permit the inclusion additional components other than the components recited in the claims. The term "consisting essentially of" should be interpreted to be partially closed and allowing the inclusion only of additional components that do not fundamentally alter the nature of the claimed subject matter.

Figure 1:
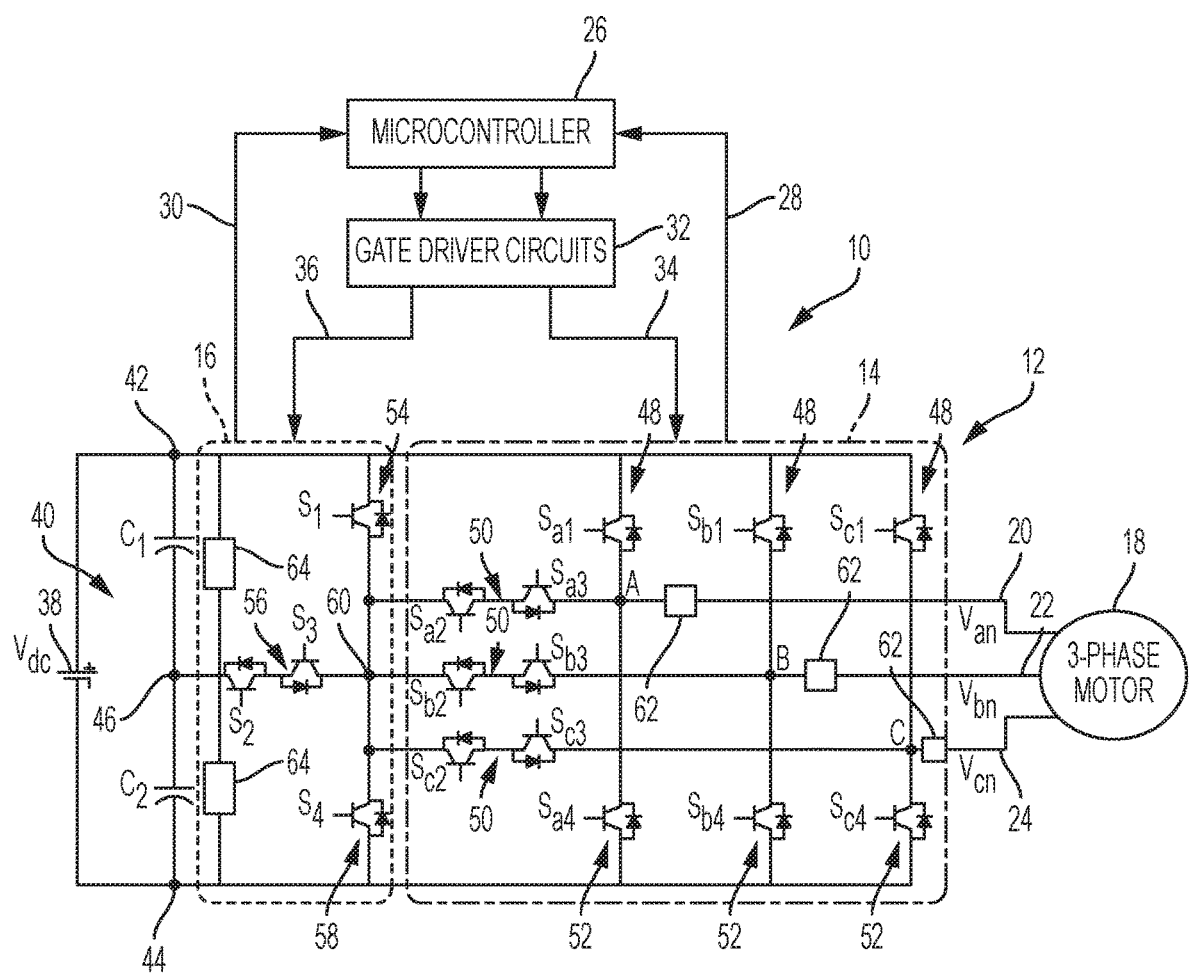
FIG. 1 is a schematic diagram of an exemplary embodiment of a fault tolerant three-phase power system.

FIG. 1 is a schematic diagram of an exemplary embodiment of a fault-tolerant three phase power system 10. The system 10 includes a fault tolerant inverter 12. More specifically, the fault-tolerant inverter 12 includes two portions, a multi-level T-Type NPC inverter 14 and a redundant phase leg 16. These portions of the fault-tolerant inverter 12 operate as disclosed herein to provide power to a 3-phase motor 18 connected to each of the exemplary three phase legs: phase leg A 20, phase leg B 22, and phase leg C 24. The fault tolerant inverter 12 comprises a plurality of switches as will be described in further detail herein.

The fault tolerant inverter 12 is connected to a microcontroller 26, which receives fault detection inputs 28 from the T-Type NPC inverter 14 and fault detection inputs 30 from the redundant phase leg 16. As will be described in further detail herein, the fault detection inputs may include measured voltages and/or currents within the fault tolerant inverter 12 which are used by the microcontroller 26 to operate the switches as described in further detail herein.

The microcontroller 26 provides control signals, exemplarily pulse width modulated (PWM) control signals to a gate driver circuit 32. The gate driver circuit 32 in turn provides gate signals 34 to the switches of the T-Type NPC inverter 14 and gate signals 36 to the switches of the redundant phase leg 16. Each switch may be embodied as an insulated-gate bipolar transistor (IGBT) or as a metal-oxide-semiconductor field effect transistor (MOSFET). The switches operate based upon the gate signals between open and closed conditions as described in further detail herein.

In an exemplary embodiment, the system 10 operates to provide three phase power from a power source 38 to a three phase motor 18. In an exemplary embodiment, the system may operate the switches at 20 kHz, although this is merely exemplary of the frequency at which the switching in exemplary embodiments may occur. The T-Type NPC inverter 14 as depicted herein exemplarily provides a simple and high efficiency power converter, particularly at lower operational voltages. Therefore, embodiments of T-Type NPC inverters 14 are exemplarily used with uninterruptable power supplies, solar power systems, and hybrid vehicles.

The power source 38 includes a DC-bus 40. The DC-bus 40 provides a positive terminal 42, a negative terminal 44, and a DC-bus midpoint terminal 46. The T-Type NPC inverter 14 includes three legs, representing outputs located at output terminal A located on phase leg A 20, output terminal B located on phase leg B 22, and output terminal C located on phase leg C 24. The T-Type NPC inverter 14 includes positive switches 48 Sx1. In the present description "x" refers to any of a, b, c representing the appropriate phase leg to which the switch is connected. The positive switches 48 (Sx1) connect the respective phase leg output terminals to the positive terminal 42. Bi-directional midpoint switches 50 (Sx2 and Sx3) connect the respective phase leg output terminals to the DC-bus midpoint terminal 46. In an exemplary embodiment, the bi-directional midpoint switches 50 (Sx2 and Sx3) are a pair of oppositely oriented IGBT switches connected in series, while in an alternative embodiment, such bi-directional switches can be integrated modular switches, such as RB-IGBTs. Negative switches 52 (Sx4) connect the respective phase leg output terminals to the negative terminal 44. By selectively operating these switches, the power provided in each of the phase legs can be controlled by the microcontroller 26.

However, it will be recognized that in the event of a short circuit or an open circuit fault of one or more of the switches in the above topology, the inverter 14 will lose functionality either resulting in less efficient operation of the inverter or failure altogether. Embodiments of the system as disclosed herein provide fault tolerance to either provide alternative operation or maintain partial operation under various detected faults in various switches. This may enable continued system operation under a fault condition before the fault can be fixed or addressed.

The system achieves the disclosed fault tolerance through the incorporation and control of a redundant phase leg 16 connected between the DC-bus 40 and the T-Type NPC inverter 14. The redundant phase leg 16 exemplarily includes a positive redundant switch 54 (S1), bi-directional midpoint redundant switches 56 (S2, S3) and negative redundant switch 58 (S4). The redundant positive switch 54 connects the positive terminal 42 to a redundant midpoint 60. The redundant negative switch 58 connects the negative terminal 44 to the redundant midpoint 60. The bi-directional midpoint redundant switch 54 connects the DC-bus midpoint 46 to the redundant midpoint 60. It will be recognized that when the bi-directional midpoint redundant switch 54 is in a closed configuration, then the DC-bus midpoint 46 and the redundant midpoint 60 will be equivalent. During normal operation (without any detected faults) the system operates with the positive redundant switch 54 and the negative redundant switch 58 open and the midpoint redundant switch 56 closed so that the redundant phase leg 16 is invisible to the inverter 14.

In embodiments, the system 10 may employ any of a variety of fault detection solutions to detect and identify faults in one or more of the switches. In an exemplary embodiment current transducers 62 are located at output terminals A, B, C, and at the DC-bus midpoint 46 or redundant midpoint 60. Additionally, voltage transducers 64 may be located between the positive terminal 42 and/or the negative terminal 44 and the DC-bus midpoint 46. These or other transducers as will be recognized by a person of ordinary skill in the art based upon the present disclosure produce fault detection inputs 28, 30 which are received by the microcontroller 26. Based upon the fault detection inputs, the microcontroller is able to detect switch faults and identify the switch and type of fault (open circuit or short circuit) that is occurring.

EXAMPLES

Operation of the system 10 will be described in further detail herein by way of a number of examples of embodiments of the system operating to mitigate various exemplary faults as may be detected and identified by the microcontroller. The following examples are illustrative and are not intended to limit the scope of the claimed subject matter.

Considering the circuit symmetry of the T-Type NPC inverter, all of the cases of switch faults are represented in four exemplary fault cases. It will be recognized that while in the merely exemplary embodiments discussed herein, faults in the Phase-A leg are discussed, similar fault tolerant operations are applicable for any of the other phase legs. Therefore it will be recognized that for disclosure purposes, for example, switches Sa1 and Sx1 (where x-a, b, or c) are interchangeable. Additionally, for the purpose of simplicity and conciseness it is assumed that only single device fault happens in the inverter. Although it will be recognized that in some embodiments multiple switch faults may be addressed as disclosed herein simultaneously. Still other embodiments as disclosed herein are also applicable for the related free-wheeling diode faults.

Case I: Open-Circuit Fault in IGBT Sa1

Figure 2:
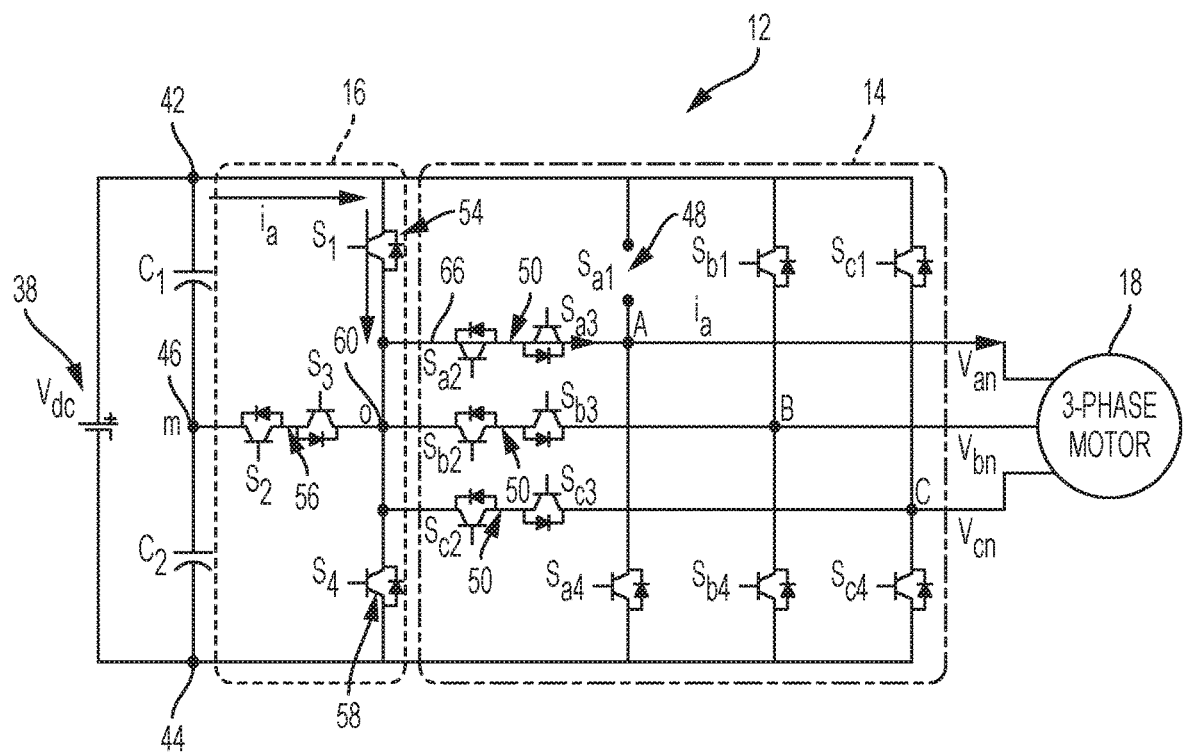
FIG. 2 is a schematic diagram depicting current flow in an embodiment of the fault tolerant T-Type NPC inverter during an exemplary open circuit fault in Switch Sa1.

FIG. 2 is a schematic diagram that depicts current flow 66 in an embodiment of the fault tolerant T-Type NPC inverter during an exemplary open circuit fault in Switch Sa1. Once an open-circuit fault in IGBT Sa1 occurs, the Phase-A leg of the T-Type inverter will not be able to produce a positive voltage. This fault is exemplarily identified by the microcontroller 26, and the microcontroller 26 provides a control signal through the gate driver circuit 32 to close the positive redundant switch 54 and to close bi-directional midpoint switch 50 (Sa2, Sa3). In such operation, IGBT Sa1 (now with an open fault) is operationally replaced by positive redundant switch 54 (S1) from the redundant phase leg 16 and midpoint switch 50 (Sa2, Sa3). The other IGBTs on the redundant leg are held in an open (off) condition. As seen in FIG. 2, the current flow 62 provides the required positive voltage to the output terminal A through the positive redundant switch S1 and the midpoint switch 50 Sa2. As can be seen, during such fault-tolerant operation, the three-phase inverter can still output rated voltage, but will be operated as a two-level inverter. It will be recognized that similar fault-tolerant solutions can be applied for open-circuit faults in other IGBTs Sx1 (where x=b or c) and Sx4 (for a negative voltage) (where x=a, b, or c).

Case II: Short-Circuit Fault in IGBT Sa1

Generally, a short-circuit failure mode in IGBT modules concludes with an open-circuit mode due to the large short-circuit current and rapid accumulated heat dissipation in IGBT bond wires or soldering joint if no fast protection actions are available (typically protection speed should be within 10 s). When a short-circuit fault exemplarily occurs in IGBT Sa1 (or Sx1 or Sx4), assuming that the large short-circuit current will change the short-circuit fault into open-circuit fault by melting the bond wires or cracking the soldering joint in the IGBT package, then the fault-tolerant solution to such fault scenario will be the same as that for open-circuit fault which is explained in Case I.

Case III: Open-Circuit Fault in IGBT Sa2

Figure 3:
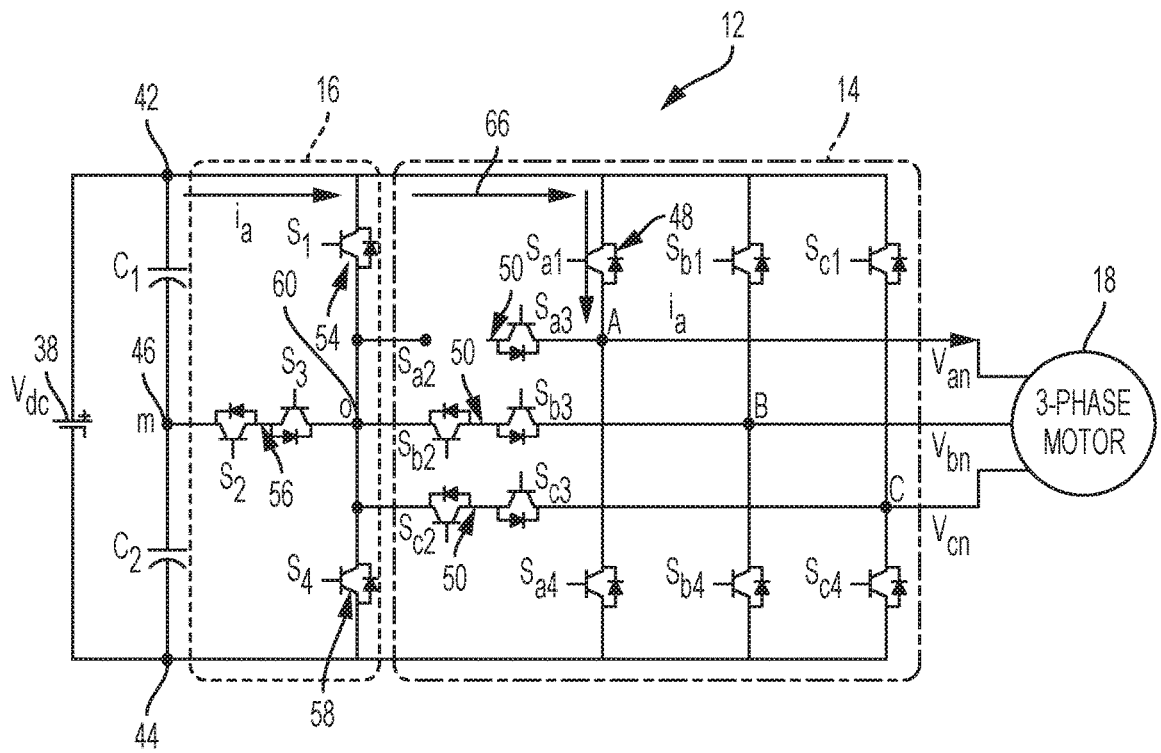
FIG. 3 is a schematic diagram depicting current flow in an embodiment of the fault tolerant T-Type NPC inverter during an exemplary open circuit fault in Switch Sa3.

FIG. 3 is a schematic diagram depicting current flow 66 in an embodiment of the fault tolerant T-Type NPC inverter during an exemplary open circuit fault in Switch Sa2. If an open-circuit fault happens in IGBT Sa2 then the open circuit fault will eliminate use of the bi-directional midpoint switch 50 accessing the DC-bus redundant midpoint 60 for the faulty phase. Upon detection of this fault by the microcontroller 26, the microcontroller provides control signals through the gate driver circuit 32 to operate the inverter 14 as a two-level inverter by only using Sx1 and Sx4 for fault-tolerant operation. The microcontroller 26 operates the circuit in this manner by turning off (open circuit condition) all of the switches on the redundant phase leg 16 and all the bi-directional midpoint switches 50 (Sx2 and Sx3) will be switched off, as depicted in FIG. 3. There is no derating for the rated and maximum voltage output during post-fault operation, but the harmonic distortion will be higher under two-level modulation compared with that under three-level modulation. It will be recognized that similar fault-tolerant solutions can be applied for open-circuit faults in other IGBTs Sx2/Sx3 in the bi-directional midpoint switches 50.

Case IV: Short-Circuit Fault in IGBT Sa2

If an exemplary short-circuit fault in IGBT Sa2 occurs, then upon the fault being identified and determined, the microcontroller 26 operates the complimentary switch Sa3 to be switched off due to the loss of reverse blocking capability. With the complementary switch Sa3 turned off, the three-level inverter is thus operated as a two-level inverter by only using Sa1 and Sa4 for post-fault operation. This operation is similar to that of case III discussed above. The similar fault-tolerant strategy can be applied for short-circuit faults in IGBTs Sx2 (where, x=b, or c) and Sx3 (where, x=a, b, or c).

As shown in the above examples, when any of the IGBTs in the T-Type inverter has a fault, there is no derating required during the fault-tolerant operating region of the inverter. However, in response to some faults, the inverter is modulated as a two-level inverter. It will be recognized that operation as a two-level inverter may result in a slightly higher harmonic distortion in the output currents and voltages compared to results as found under three-level healthy operation. However, particularly when inverters are used in safety-critical applications, a trade-off of efficiency is reasonable to maintain operation, particularly until the fault condition can be fixed or resolved.

Figure 4:
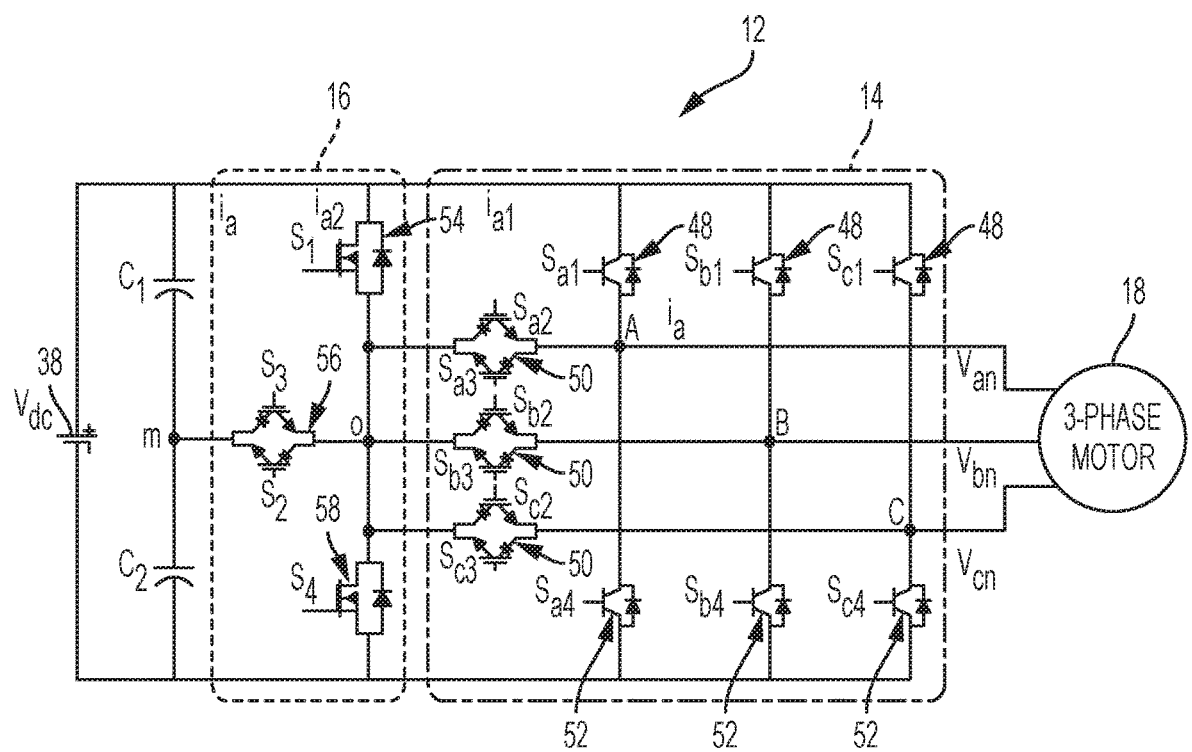
FIG. 4 is a schematic diagram depicting another exemplary embodiment of a fault tolerant T-Type NPC inverter.

FIG. 4 is a schematic diagram depicting another exemplary embodiment of a fault tolerant T-Type NPC inverter 12. In the exemplary embodiment of the fault tolerant T-Type NPC inverter. In the exemplary embodiment of the fault tolerant inverter 12, it will be recognized that positive redundant switch 54 (S1) and the negative redundant switch 58 (S4) are embodied in metal-oxide-semiconductor field effect transistors (MOSFET). In an exemplary embodiment, the MOSFETs are SiC MOSFETs. It will be recognized that MOSFETs provide higher efficiency, but that this efficiency comes at a greater cost. However, the inventors have recognized that use of the MOSFETs in the redundant phase leg 16 provides improved efficiency beyond as what would be expected by only replacing two IGBTs with MOSFETSs and that these efficiencies counterbalance the reduced efficiency of the inverter when operating in a fault condition. Additionally, the bi-directional midpoint redundant switches 56 (S2, S3) and the bi-directional midpoint switches 50 (Sx2, Sx3) are instead embodied with RB-IGBTs, due to the low voltage drop provided by the configurations.

In exemplary embodiments, the system 10 as disclosed herein can further be used to provide a T-Type NPC inverter 14 with improved thermal overload capability. In an exemplary embodiment, this may be particularly advantageous when implemented in an embodiment of the fault-tolerant inverter 12 as depicted in FIG. 4. Three-level NPC inverters exhibit output voltage waveforms similar to two-level inverters at low amplitude modulation indices (i.e., Ma≤0.5). Therefore, the bi-directional midpoint switches 50 (Sx2 and Sx3 x=a, b, c) under low modulation indices, instead of being used to output any zero voltage states, can be used to conduct the redundant phase leg to the inherent three legs to share overload current.

Figure 5:
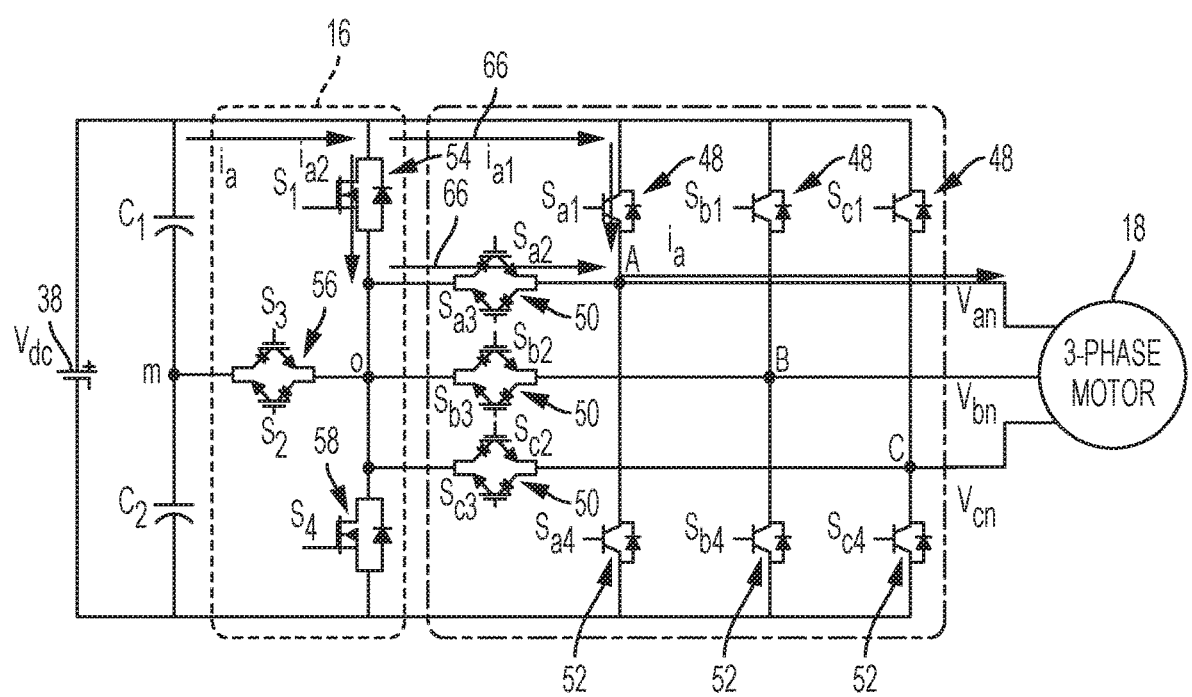
FIG. 5 is a schematic diagram depicting current flow in an embodiment of the fault tolerant T-Type NPC inverter during exemplary operation to provide thermal overload capability.

FIG. 5 is a schematic diagram depicting current flow 66 in an embodiment of the fault tolerant T-Type NPC inverter 12 during exemplary operation to provide thermal overload capability. In an exemplary embodiment, the microcontroller detects a condition of an overload current in the inverter 12. Upon detection of an overload current, for example at the positive terminal 42, the microcontroller 26 provides a control signal through the gate driver circuit 32 to close the positive redundant switch 54 and the bi-directional midpoint switch 50 (Sa2, Sa3) to provide a parallel path for the overload current to phase leg A. This parallel path helps to dissipate the overload current, providing thermal protection to the inverter. It will be recognized that the system 10 may operate in a similar manner to provide overload current protection to other switches in the system (e.g. Sx1, Sx4 wherein x=a, b, c).

Figure 6A:
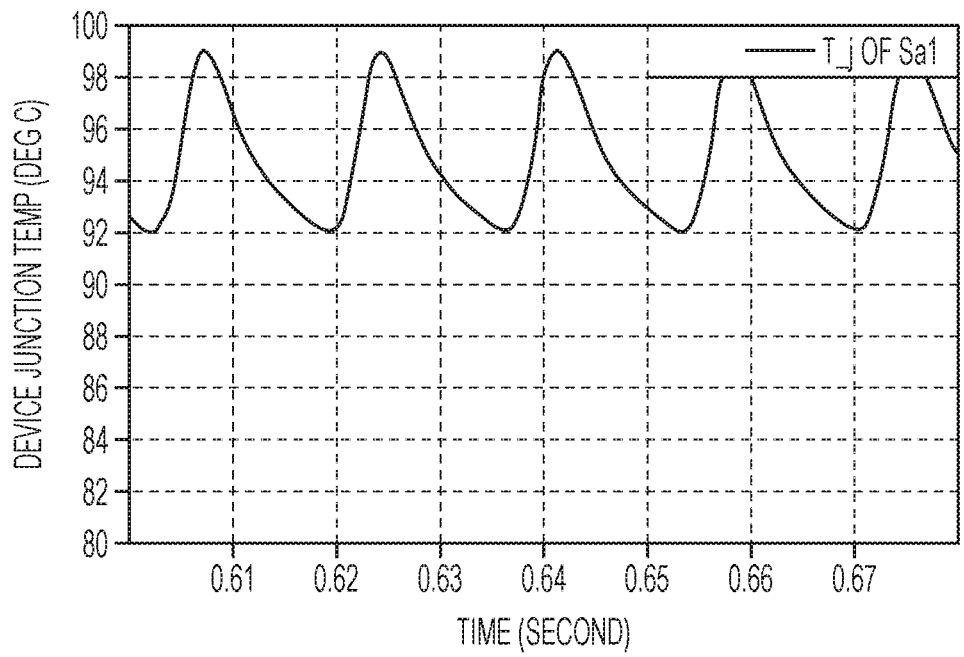
FIGS. 6A and 6B are graphs exemplarily depicting a comparison of junction temperature profiles of circuits with and without using thermal overload capability.
Figure 6B:
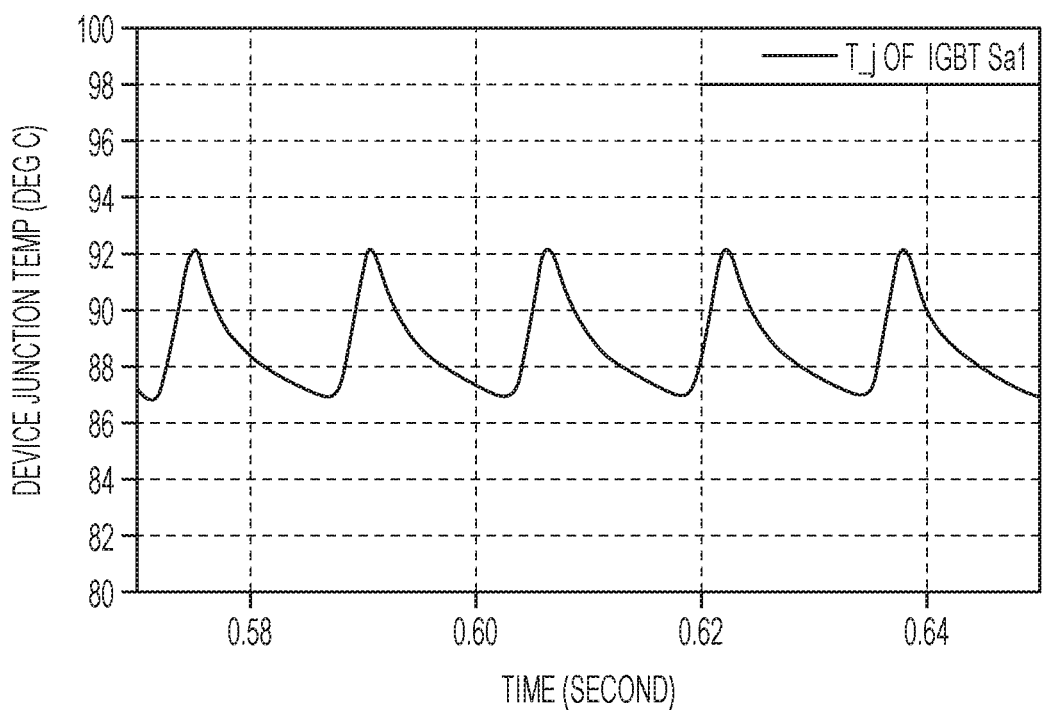

FIGS. 6A and 6B are graphs that depict an exemplary comparison of junction temperature profiles of exemplary IGBT Sa1 with and without using thermal overload capability as disclosed above using a redundant phase leg. The junction temperature profiles of the IGBT Sa1 with/without the current sharing from the redundant phase leg under the same thermal overload capability. FIG. 6A is a graph of the junction temperature profile of an inverter operated in an overload condition in a conventional manner. FIG. 6B is a graph of the junction temperature profile of an inverter operated in an overload mitigating configuration according to the manner as disclosed above. As can be readily seen from the comparison of the graphs, the disclosed overload mitigating configuration provides a substantial reduction in junction temperature. This improvement may be particularly suitable for some industrial applications such as EVs, servo motor drives, etc., where overload or high torque is one of the most common functional requirements.

It will be recognized that in embodiments, the losses distribution among devices in T-Type NPC inverter 12 is unbalanced. For example, when the inverter is operating at high modulation indices most of the device losses are dissipated from the positive switches 48 (Sx1) and the negative switches 52 (Sx4). To alleviate the high junction temperatures in these main IGBT modules, a quasi zero-voltage-switching (ZVS) strategy is used to transfer the switching losses from the respective positive switch 48 or negative switch 52 to the positive redundant switch 54 (S1) and the negative redundant switch 58 (S4) on the redundant phase leg 16 and the bi-directional midpoint switches 50 (Sx2, Sx3) in the T-Type inverter 14.

Figure 7:
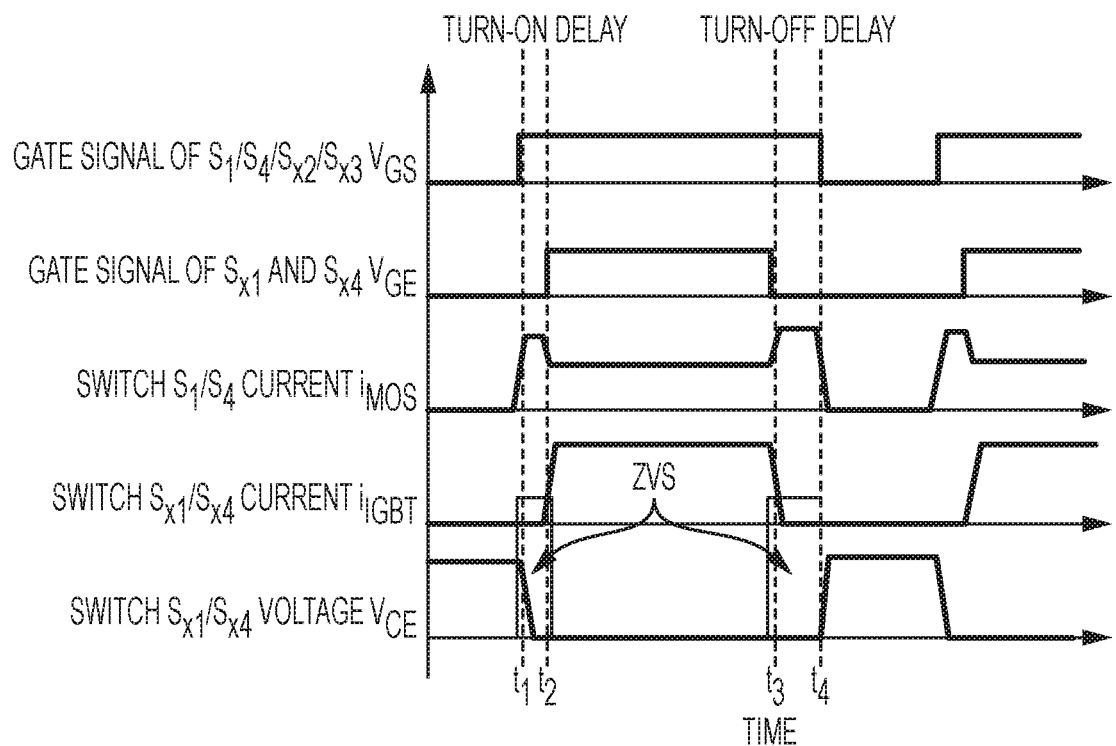
FIG. 7 is a timing diagram of an exemplary quasi-ZVS switching sequence.

FIG. 7 is a timing diagram of an exemplary quasi-ZVX switching sequence as may be used with exemplary embodiments as disclosed herein. When the redundant phase leg 16 is operated by the microcontroller 26 to share the overload current with other legs, the positive redundant switch 54 (S1) and the negative redundant switch 58 (S4) and the bi-directional midpoint switches 50 (Sx2, Sx3) are switched on prior to the turn-on of positive switches 48 (Sx1) and the negative switches 52 (Sx4). This provides a very low on-state voltage for the subsequent switching-on of the positive switches 48 (Sx1) and the negative switches 52 (Sx4). When the switches are turned off, the process reverses with the positive switches 48 (Sx1) and the negative switches 52 (Sx4) turned off first. Then the positive redundant switch 54 (S1) and the negative redundant switch 58 (S4) and the bi-directional midpoint switches 50 (Sx2, Sx3) are switched off to similarly achieve quasi-ZVS soft switching.

Figure 8:
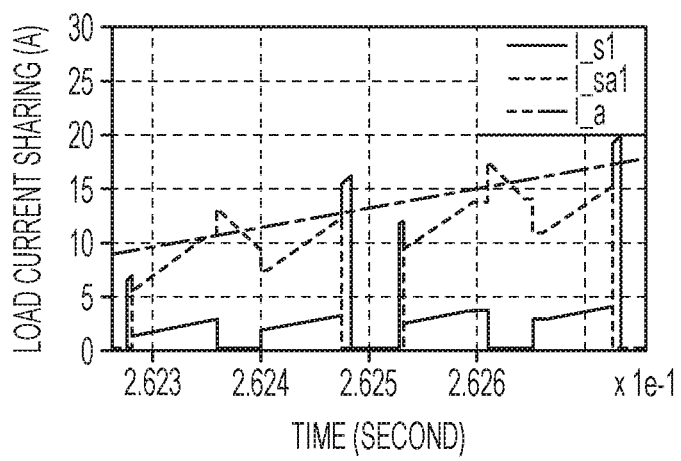
FIG. 8 is a graph that exemplarily depicts load current sharing between switches S1 and Sa1.

Exemplary embodiments of the soft-switching as disclosed herein can further improve the relief of thermal stress in the positive switches 48 (Sx1) and the negative switches 52 (Sx4). FIG. 8 is a graph that exemplarily depicts load current sharing between switches S1 and Sa1. FIG. 8 exemplarily shows the current sharing at the turn-on instant, turn-off instant, as well as the current sharing under parallel conduction mode. It should be noted that not for all the switching states can the redundant leg be utilized for current sharing, which is the reason for the discontinuous current sharing between switches S1 and Sa1 shown in FIG. 8.

REFERENCES

The following references are hereby noted and incorporated herein by reference in their entireties.

M. Schweizer and J. W. Kolar, "Design and implementation of a highly efficient three-level T-Type converter for low-voltage applications," IEEE Trans. on Power Electronics, vol. 28, no. 2, pp. 899-907, February 2013.

S. Chen, S. Ogawa, and A. Iso, "High-power IGBT modules for 3-level power converters," FUJI Electric Review, vol. 59, no. 4, 2013.

U. Choi, F. Blaabjerg, and K. Lee, "Reliability improvement of a T-Type three-level inverter with fault-tolerant control strategy," IEEE Trans. on Power Electronics, vol. 30, no. 5, pp. 2660-2673, May 2015.

W. Zhang, et al, "A fault-tolerant T-Type three-level inverter system," in IEEE 2014 Applied Power Electronics Conference (APEC), 2014, pp. 274-280.

L. M. Tolbert, F. Z. Peng, and T. G. Habetler, "Multilevel PWM Methods at low modulation indices," IEEE Trans. on Power Electronics, vol. 15, no. 4, pp. 719-725, July 2000.

J. He, T. Zhao, X. Jing, and N. A. O. Demerdash, "Application of wide bandgap devices in renewable energy systems-benefits and challenges," in Proc. of IEEE 2014 International Conference on Renewable Energy Research and Application (ICRERA), 2014, pp. 749-754.

T. Zhao and J. He, "An optimal switching pattern for "SiC+Si" hybrid device based voltage source converters," in Proc. of IEEE 2015 Applied Power Electronics Conference (APEC), 2015, pp. 1276-1281.

In an exemplary embodiment of a power conversion system, the power conversion system includes an inverter with a plurality of inverter phase legs, each phase leg including a positive switch, a negative switch, and a bi-directional midpoint switch. A redundant phase leg of the power conversion system includes a positive redundant switch and a negative redundant switch. The positive redundant switch is connected in series with the bi-directional midpoint switches and in parallel with the positive switches through the bi-directional midpoint switches. The negative redundant switch is connected in series with the bi-directional midpoint switches and in parallel with the negative switches through the bi-directional midpoint switches. In an exemplary embodiment, the inverter may be a neutral-point-clamped (NPC) T-type power converter.

Exemplary embodiments of the power conversion system further include upon detection of a fault condition in at least one switch of the plurality of inverter phase legs, one of the positive redundant switches and the negative redundant switches are closed to bypass the at least one switch with the fault condition and maintain operation of the power conversion system.

In an exemplary embodiment of the power conversion system, upon detection of an overload condition, the microcontroller operates the bi-directional midpoint switches and one of the redundant positive switch and the redundant negative switch to the open condition to provide an additional current pathway. Still further, the positive redundant switch and the negative redundant switch may be metal-oxide-semiconductor field effect transistors (MOSFET) and the bi-directional midpoint switches are reverse blocking insulated-gate bipolar transistors (RB-IGBT).

In the exemplary embodiment of the power conversion system, the system further includes a DC-bus including a DC-bus midpoint. The redundant phase leg of the system further includes a redundant midpoint switch connected between the DC-bus midpoint and the redundant positive switch and the redundant negative switch to define a redundant midpoint.

The power conversion system in addition to any of the embodiments described above further include that the bi-directional midpoint switches of the inverter phase legs are connected to the redundant midpoint. In a further embodiment of the power conversion system, upon detection of a fault in a switch of the inverter, the microcontroller operates the redundant midpoint switch to an open condition. Additionally, in an embodiment, upon detection of a fault in a positive switch, the microcontroller operates the redundant positive switch in the closed condition and the bi-directional midpoint switch in a closed position to provide positive voltage to the phase leg with the fault condition. In another embodiment of the power conversion system, upon detection of a fault in a bi-directional midpoint switch, the microcontroller operates the positive switch or the negative switch of the phase leg with the fault condition into the closed condition to provide voltage to the phase leg with the fault condition.

In an exemplary embodiment of the power conversion system, the microcontroller uses a quasi-zero-voltage-switching (ZVS) strategy to transfer switching losses from the positive switches and the negative switches to the redundant positive switch, the redundant negative switch, and the bi-directional midpoint switches. In a further exemplary embodiment of the power conversion system, the microcontroller operates the redundant positive switch, the redundant negative switch, and the bi-directional midpoint switches to a closed condition prior to operating the positive switches and the negative switches to the closed condition and the microcontroller operates the positive switches and the negative switches to the open configuration prior to operating the redundant positive switch, the redundant negative switch, and the bi-directional midpoint switches to the open condition.

In an exemplary embodiment of a method of fault tolerant operation of a T-type power converter, a T-type power converter is provided. The T-type power converter includes a DC-bus with a DC-bus midpoint and three inverter phase legs operatively connected to the DC-bus. Each phase leg of the inverter includes a positive switch, a negative switch, and a bi-directional midpoint switch. A redundant phase leg of the power converter includes a positive redundant switch and a negative redundant switch. The positive and negative redundant switches are connected in series with the bi-directional midpoint switches to a redundant midpoint. The positive redundant switch is connected in parallel with the positive switches through the bi-directional midpoint switches. The negative redundant switch is connected in parallel with the negative switches through the bi-directional midpoint switches. A midpoint redundant switch is connected between the DC-bus midpoint and the redundant midpoint.

Exemplary embodiments of the method further include monitoring at least one current within the T-type power converter with a microcontroller. A fault condition in the T-type power converter is identified based upon the at least one current. A switch location of the fault condition is determined based upon at least one current. Upon detection of the fault condition, the midpoint redundant switch is switched to an open condition and at least one of the positive redundant switches and one of the negative redundant switches are switched to a closed condition to bypass the switch location of the fault condition. Operation of the T-type power converter is maintained.

Other exemplary embodiments of the method further include monitoring at least one current or voltage within the T-type power converter with a microcontroller. Upon detection of an overload condition, the microcontroller operates the bi-directional midpoint switches and one of the redundant positive switches and one of the redundant negative switches to the open condition to provide an additional current pathway. Still further, the positive redundant switch and the negative redundant switch may be metal-oxide-semiconductor field effect transistors (MOSFET) and the bi-directional midpoint switches are reverse blocking insulated-gate bipolar transistors (RB-IGBT).

In the exemplary embodiment of the method, the power converter includes a DC-bus including a DC-bus midpoint. The redundant phase leg of the power converter further includes a redundant midpoint switch connected between the DC-bus midpoint and the redundant positive switch and the redundant negative switch to define a redundant midpoint.

In an exemplary embodiment of the method, the microcontroller uses a quasi-zero-voltage-switching (ZVS) strategy to transfer switching losses from the positive switches and the negative switches to the redundant positive switch, the redundant negative switch, and the bi-directional midpoint switches. In a further exemplary embodiment of the method, the microcontroller operates the redundant positive switch, the redundant negative switch, and the bi-directional midpoint switches to closed conditions prior to operating the positive switches and the negative switches to the closed conditions and the microcontroller switches the positive switches and the negative switches to the open conditions prior to operating the redundant positive switch, the redundant negative switch, and the bi-directional midpoint switches to the open conditions.

In the foregoing description, it will be readily apparent to one skilled in the art that varying substitutions and modifications may be made to the invention disclosed herein without departing from the scope and spirit of the invention. The invention illustratively described herein suitably may be practiced in the absence of any element or elements, limitation or limitations which is not specifically disclosed herein. The terms and expressions which have been employed are used as terms of description and not of limitation, and there is no intention that in the use of such terms and expressions of excluding any equivalents of the features shown and described or portions thereof, but it is recognized that various modifications are possible within the scope of the invention. Thus, it should be understood that although the present invention has been illustrated by specific embodiments and optional features, modification and/or variation of the concepts herein disclosed may be resorted to by those skilled in the art, and that such modifications and variations are considered to be within the scope of this invention.

Citations to a number of patent and non-patent references are made herein. The cited references are incorporated by reference herein in their entireties. In the event that there is an inconsistency between a definition of a term in the specification as compared to a definition of the term in a cited reference, the term should be interpreted based on the definition in the specification.

In the above description, certain terms have been used for brevity, clarity, and understanding. No unnecessary limitations are to be inferred therefrom beyond the requirement of the prior art because such terms are used for descriptive purposes and are intended to be broadly construed. The different systems and method steps described herein may be used alone or in combination with other systems and methods. It is to be expected that various equivalents, alternatives and modifications are possible within the scope of the appended claims.

The functional block diagrams, operational sequences, and flow diagrams provided in the Figures are representative of exemplary architectures, environments, and methodologies for performing novel aspects of the disclosure. While, for purposes of simplicity of explanation, the methodologies included herein may be in the form of a functional diagram, operational sequence, or flow diagram, and may be described as a series of acts, it is to be understood and appreciated that the methodologies are not limited by the order of acts, as some acts may, in accordance therewith, occur in a different order and/or concurrently with other acts from that shown and described herein. For example, those skilled in the art will understand and appreciate that a methodology can alternatively be represented as a series of interrelated states or events, such as in a state diagram. Moreover, not all acts illustrated in a methodology may be required for a novel implementation.

This written description uses examples to disclose the invention, including the best mode, and also to enable any person skilled in the art to make and use the invention. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

The invention claimed is:

1. A power conversion system, comprising:
   an inverter with a plurality of inverter phase legs, each phase leg comprising a positive switch, a negative switch, and a bi-directional midpoint switch;
   a redundant phase leg comprising a positive redundant switch and a negative redundant switch, the positive redundant switch connected in series to the bi-directional midpoint switches and in parallel with the positive switches through the bi-directional midpoint switches, and the negative redundant switch connected in series with the bi-directional midpoint switches and in parallel with the negative switches through the bi-directional midpoint switches;
   wherein upon detection of a fault condition in at least one switch of the plurality of inverter phase legs, one of the positive redundant switches and the negative redundant switches are closed to bypass the at least one switch with the fault condition and maintain operation of the power conversion system.

2. The power conversion system of claim 1, further comprising a microcontroller and gate drivers operably connected to the switches of the plurality of inverter phase legs and to the switches of the redundant phase leg.

3. The power conversion system of claim 2, further comprising a gate driver circuit operably connected between the microcontroller and the switches of the plurality of inverter phase legs and the switches of the redundant phase leg, wherein the gate driver circuit receives pulse width modulated control signals from the microcontroller and sends gate control signals to the respective switches.

4. The power conversion system of claim 2, further comprising a plurality of current transducers, a current transducer of the plurality each associated with each leg of the plurality of inverter phase legs, the plurality of current transducers communicatively connected to the microcontroller to provide the microcontroller with current measurement signals, wherein the microcontroller identifies a fault condition in the inverter and determines a switch location of the identified fault from at least the current measurement signals.

5. The power conversion system of claim 4, further comprising:
   a positive capacitor and a negative capacitor connected in series between a positive terminal and a negative terminal to define a DC-bus midpoint;
   a positive voltage transducer connected between the positive terminal and the DC-bus midpoint; and
   a negative voltage transducer connected between the negative terminal and the DC-bus midpoint;
   wherein the positive voltage transducer and the negative voltage transducer are communicatively connected to the microcontroller to provide the microcontroller with voltage measurement signals used by the microcontroller to identify the fault condition and determines the switch location of the identified fault condition.

6. The power conversion system of claim 2, further comprising:
   a three phase motor connected to the inverter, wherein the plurality of inverter phase legs comprises three inverter phase legs.

7. The power conversion system of claim 2, further comprising:
   a DC-bus comprising a DC-bus midpoint; and
   the redundant phase leg further comprises a redundant midpoint switch connected between the DC-bus midpoint and the redundant positive switch and the redundant negative switch to define a redundant midpoint.

8. The power conversion system of claim 7, wherein the bi-directional midpoint switches of the inverter phase legs are connected to the redundant midpoint.

9. The power conversion system of claim 8, wherein upon detection of a fault in a switch of the inverter, the microcontroller operates the redundant midpoint switch to an open condition.

10. The power conversion system of claim 9, wherein upon detection of a fault in a positive switch, the microcontroller operates the redundant positive switch in the closed condition and the bi-directional midpoint switch in a closed position to provide positive voltage to the phase leg with the fault condition.

11. The power conversion system of claim 9, wherein upon detection of a fault in a bi-directional midpoint switch, the microcontroller operates the positive switch or the negative switch of the phase leg with the fault condition into the closed condition to provide voltage to the related phase leg with the fault condition.

12. The power conversion system of claim 2, wherein the microcontroller uses a quasi-zero-voltage-switching (ZVS) strategy to transfer switching losses from the positive switches and the negative switches to the redundant positive switch, and the redundant negative switch.

13. The power conversion system of claim 2, wherein the microcontroller uses a zero-current-switching (ZCS) strategy to transfer switching losses from the bi-directional mid-point switches to the redundant positive switch, and the redundant negative switch.

14. The power conversion system of claim 2, wherein the microcontroller operates the redundant positive switch, the redundant negative switch, and the bi-directional midpoint switches to a closed configuration prior to operating the positive switches and the negative switches to the closed configuration and the microcontroller operates the positive switches and the negative switches to the open configuration prior to operating the redundant positive switch, the redundant negative switch, and the bi-directional midpoint switches to the open configuration.

15. The power conversion system of claim 1, wherein the inverter is at least one of a neutral-point-clamped (NPC) _power converter, a T-type NPC power converter, an I-type NPC power converter, or an active NPC power converter.

16. The power conversion system of claim 1, wherein the bi-directional midpoint switches each comprises a pair of oppositely oriented switches in series.

17. The power conversion system of claim 1, wherein the switches each comprise a diode and a solid-state switch comprising at least one of an insulated-gate bipolar transistor (IGBT) and a metal-oxide-semiconductor field effect transistor (MOSFET).

18. The power conversion system of claim 1, wherein the positive redundant switch and the negative redundant switch are metal-oxide-semiconductor field effect transistors (MOSFET).

19. A method of fault tolerant operation of a T-type power converter comprising:
providing a T-type power converter comprising:
  a DC-bus comprising a DC-bus midpoint and three inverter phase legs operatively connected to the DC-bus, each phase leg comprising a positive switch, a negative switch, and a bi-directional midpoint switch;
  a redundant phase leg comprising a positive redundant switch and a negative redundant switch, the positive and negative redundant switches connected in series with the bi-directional midpoint switches through a redundant midpoint, the positive redundant switch connected in parallel with the positive switches through the bi-directional midpoint switches, the negative redundant switch connected in parallel with the negative switches through the bi-directional midpoint switches, and a bi-directional midpoint redundant switch connected between the DC-bus midpoint and the redundant midpoint;
monitoring at least one current within the T-type power converter with a microcontroller;
identifying a fault condition in the T-type power converter based upon the at least one current;
determining a switch location of the fault condition based upon the at least one current;
upon detection of the fault condition, switching the bi-directional midpoint redundant switch to an open condition and operating at least one of the positive redundant switches and one of the negative redundant switches to a closed condition to bypass the switch location of the fault condition; and
maintaining operation of the T-type power converter.

20. The method of claim 19, wherein the switch location is a positive switch of one of the inverter phase legs of the original three inverter phase legs, and further comprising:
  operating the redundant positive switch in the closed condition;
  operating the bi-directional midpoint switch of the inverter phase leg with the switch location in a closed condition;
  operating the midpoint redundant switch and the negative redundant switch in the open condition; and
  providing positive voltage to the inverter phase leg through the redundant positive switch and the bi-directional midpoint switch.

21. The method of claim 19, wherein the switch location is a bi-directional midpoint switch of one of the inverter phase legs of the original three inverter phase legs, and further comprising:
  operating the redundant positive switch in the open condition;
  operating the bi-directional midpoint switch of the inverter phase leg in an open condition;
  operating the midpoint redundant switch in an open condition;
  operating the positive switch in a closed condition; and
  providing positive voltage to the inverter phase leg through the positive switch.

* * * * *